United States Patent
Sudul et al.

(10) Patent No.: US 10,937,059 B1
(45) Date of Patent: Mar. 2, 2021

(54) SYSTEMS, APPARATUS, AND METHODS FOR PROVIDING LOCAL PROMOTIONS

(71) Applicant: Groupon, Inc., Chicago, IL (US)

(72) Inventors: Gareth Douglas Sudul, San Francisco, CA (US); Eric David Radist, Chicago, IL (US); Puneet Shah, San Francisco, CA (US); Ronald Mardenly, San Francisco, CA (US)

(73) Assignee: GROUPON, INC., Chicago, IL (US)

( * ) Notice: Subject to any disclaimer, the term of this patent is extended or adjusted under 35 U.S.C. 154(b) by 334 days.

(21) Appl. No.: 14/571,013

(22) Filed: Dec. 15, 2014

Related U.S. Application Data

(60) Provisional application No. 61/916,065, filed on Dec. 13, 2013, provisional application No. 61/916,067, filed on Dec. 13, 2013, provisional application No. 61/916,066, filed on Dec. 13, 2013.

(51) Int. Cl.
  *G06Q 30/00* (2012.01)
  *G06Q 30/02* (2012.01)
  *G06Q 10/08* (2012.01)

(52) U.S. Cl.
  CPC ....... *G06Q 30/0261* (2013.01); *G06Q 10/083* (2013.01); *G06Q 30/0267* (2013.01)

(58) Field of Classification Search
  CPC .............. G06Q 30/0207–0277; G06Q 10/083
  See application file for complete search history.

(56) References Cited

U.S. PATENT DOCUMENTS

| | | | |
|---|---|---|---|
| 5,903,652 A | * | 5/1999 | Mital .............. G06Q 20/04 705/26.25 |
| 7,668,754 B1 | | 2/2010 | Bridgelall |
| 7,848,949 B1 | | 12/2010 | Delanders et al. |
| 10,078,861 B1 | * | 9/2018 | Clare .............. G06Q 30/0635 |
| 2002/0077937 A1 | | 6/2002 | Lyons et al. |
| 2004/0044571 A1 | | 3/2004 | Bronnimann et al. |
| 2007/0185775 A1 | | 8/2007 | Lawton |
| 2007/0202887 A1 | * | 8/2007 | Counts .............. G01S 5/0252 455/456.1 |
| 2007/0214042 A1 | | 9/2007 | Dominowska |

(Continued)

OTHER PUBLICATIONS

Facebook News Feed Timeline: A Look at Changes Through the Years—http://www.huffingtonpost.com/craig-kanalley/facebook-news-feed-timeline_b_2821060.html—May 6, 2013.

(Continued)

*Primary Examiner* — Kambiz Abdi
*Assistant Examiner* — Christopher Stroud
(74) *Attorney, Agent, or Firm* — Alston & Bird LLP

(57) ABSTRACT

Systems, apparatus, and methods for providing local promotions are discussed herein. Some embodiments may include an apparatus including circuitry configured to receive promotion purchase data from a consumer device indicating purchase of a promotion. The circuitry may be further configured to determine a location of the consumer device and a merchant location of a merchant capable of fulfilling redemption of the promotion. The circuitry may then facilitate the redemption of the promotion with the merchant at the merchant location. For example, the circuitry may communicate with a suitable merchant device of the merchant to facilitate redemption fulfillment options such as in-store pickup and/or shipping.

20 Claims, 6 Drawing Sheets

(56) References Cited

U.S. PATENT DOCUMENTS

| | | | |
|---|---|---|---|
| 2009/0138377 A1* | 5/2009 | Oh | G06Q 30/0601 |
| | | | 705/26.1 |
| 2009/0187489 A1* | 7/2009 | Mallick | G06Q 30/06 |
| | | | 705/26.1 |
| 2009/0204500 A1 | 8/2009 | Shpun et al. | |
| 2010/0250372 A1* | 9/2010 | Smith | G06Q 20/045 |
| | | | 705/14.68 |
| 2011/0071895 A1* | 3/2011 | Masri | G06Q 30/0207 |
| | | | 705/14.27 |
| 2011/0282725 A1* | 11/2011 | Chatterjee | G06Q 30/02 |
| | | | 705/14.24 |
| 2012/0029990 A1 | 2/2012 | Fisher | |
| 2012/0101881 A1 | 4/2012 | Patterson | |
| 2012/0130784 A1 | 5/2012 | Knudson | |
| 2012/0210353 A1 | 8/2012 | Wong et al. | |
| 2012/0271705 A1 | 10/2012 | Postrel | |
| 2013/0018778 A1 | 1/2013 | Bohanan et al. | |
| 2013/0060635 A1 | 3/2013 | Walker et al. | |
| 2013/0132179 A1* | 5/2013 | Wu | G06Q 30/02 |
| | | | 705/14.23 |
| 2013/0166386 A1 | 6/2013 | Simmons | |
| 2013/0197990 A1 | 8/2013 | Velkoski et al. | |
| 2013/0261792 A1* | 10/2013 | Gupta | G06Q 10/08 |
| | | | 700/232 |
| 2013/0275221 A1 | 10/2013 | Zeto et al. | |
| 2014/0164120 A1 | 6/2014 | Payne et al. | |

OTHER PUBLICATIONS

U.S. Appl. No. 61/866,026, filed Aug. 14, 2013; In re: Sudul et al., entitled Configuring Promotions For Local Pickup of Goods.

"Location-Based Services—Application" [Retrieved on Jun. 25, 2020] Retrieved from the Internet URL:http://geoawesomeness.com/knowledge-based/location-based-services/location-based-services-applications/ dated (2011-2012).

"Location-Based Services: Make the Most of a GPS-Enabled Phone" [Retrieved on Jun. 25, 2020], Retrieved from the Internet URL:http://www.pcworld.com/article/201119/location_based_services_make_the_most_of_a_gps_phone.html dated Jul. 14, 2010.

"Three-quarters of smartphone owners use location-based services" [Retrieved on Jun. 25, 2020] Retrieved from Internet URL://http://www.pewinternet.org/2012/05/11/three-quarters-of-smartphone-owners-use-location-based-services/ dated May 5, 2012.

"Understanding Location Based Advertising" [Retrieved on Jun. 25, 2020] Retrieved from the Internet URL:http://www.acquisio.com/blog/local/understanding-location-based-advertising/ dated Feb. 3, 2012.

\* cited by examiner

SYSTEMS, APPARATUS, AND METHODS FOR PROVIDING LOCAL PROMOTIONS

CROSS-REFERENCE TO RELATED APPLICATIONS

This application claims the benefit of U.S. Provisional Patent Application No. 61/916,065, titled "Systems, Apparatus, and Methods for Providing Local Promotions," U.S. Provisional Patent Application No. 61/916,066, titled "Systems, Apparatus, And Methods For Providing Merchant-Defined Local Promotions," filed Dec. 13, 2013, and U.S. Provisional Patent Application No. 61/916,067, titled "Systems, Apparatus, And Methods For Providing Promotion Newsfeeds," filed Dec. 13, 2013, each of which is incorporated by reference herein in its entirety.

FIELD

Embodiments discussed herein relate, generally, to techniques for programmatically providing promotions to consumers based on location.

BACKGROUND

Via electronic networks (e.g., the Internet), systems can provide promotions (e.g., for items, experiences, and/or services) associated with merchants to consumer devices. Online commercial environments have supplemented or even begun replacing traditional brick-and-mortar locations of merchants. However, brick-and-mortar shops are often best equipped to serve local consumers for a variety of reasons. In this regard, areas for improving current systems have been identified.

BRIEF SUMMARY

Through applied effort, ingenuity, and innovation, solutions to improve such systems have been realized and are described herein. Advantageously, the techniques discussed herein may allow for the efficient and location-aware routing of electronic data via a network to suitable merchant devices. Some embodiments may provide for a system (e.g., one or more servers) and/or apparatus with circuitry configured to: receive, via a network, promotion purchase data from a consumer device indicating purchase of a promotion; determine a location of the consumer device; determine a redemption fulfillment option for the promotion, wherein the redemption fulfillment option includes at least one of shipping or in-store pickup; determine a merchant location of a merchant capable of fulfilling redemption of the promotion via the redemption fulfillment option, wherein the determination of the merchant location is based on the circuitry being configured to: access merchant location data defining one or more merchant locations from a merchant database; and compare the one or more merchant locations with the location of the consumer device; and facilitate the redemption of the promotion with the merchant via the redemption fulfillment option.

In some embodiments, the circuitry may be further configured to receive redemption fulfillment option data from the consumer device. The circuitry configured to determine the redemption fulfillment option includes the circuitry being configured to determine the redemption fulfillment option based on the redemption fulfillment option data.

In some embodiments, the circuitry configured to determine the merchant location includes the circuitry being configured to determine that the merchant location is a nearest merchant location to the consumer device capable of fulfilling the redemption of the promotion via the redemption fulfillment option.

In some embodiments, the circuitry configured to determine the redemption fulfillment option may include the circuitry being configured to determine the redemption fulfillment option as shipping; and the circuitry configured to facilitate the redemption of the promotion with the merchant further may include the circuitry being configured to provide shipping data to a merchant device associated with the merchant via the network.

In some embodiments, the circuitry may be further configured to provide redemption data to the consumer device, wherein the redemption data incudes one or more of a shipping timeline or return instructions.

In some embodiments, the circuitry configured to determine the redemption fulfillment option may include the circuitry being configured to determine the redemption fulfillment option as in-store pickup; and the circuitry configured to facilitate the redemption of the promotion with the merchant may include the circuitry being configured to: generate an instrument for the redemption of the promotion; and provide the instrument to the consumer device via the network.

In some embodiments, the circuitry may be further configured to provide redemption data to the consumer device; and the redemption data may include one or more of redemption instructions and a redemption deadline.

In some embodiments, the circuitry configured to determine the redemption fulfillment option may include the circuitry being configured to determine the redemption fulfillment option as in-store pickup; and the circuitry configured to facilitate the redemption of the promotion with the merchant may include the circuitry being configured to: generate a promotion redemption identifier; provide, via the network, the promotion identifier to the consumer device via the network; and receive, via the network, the promotion identifier from a merchant device associated with the merchant.

In some embodiments, the determination of the merchant location may be further based on the circuitry being configured to: provide, via the network, the one or more merchant locations to the consumer device; and subsequent to providing the one or more merchant locations to the consumer device, receive redemption location data from the consumer device via the network, the redemption location data indicating a selection of the merchant location for the redemption of the promotion.

In some embodiments, the circuitry configured to determine the redemption fulfillment option may include the circuitry being configured to determine the redemption fulfillment option as in-store pickup; and the circuitry may be further configured to: determine, based on the location of the consumer device, whether the consumer device is within an in-store pickup notification distance of the merchant location; and in response to determining that the consumer device is within the in-store pickup notification distance of the merchant location, send an in-store pickup notification to at least one of the consumer device and a merchant device associated with the merchant via the network.

In some embodiments, the circuitry configured to determine the redemption fulfillment option includes the circuitry being configured to: determine, based on the merchant location and the location of the consumer device, whether the consumer device is in-market or out-of-market relative to the merchant location; and in response to determining that the consumer device is in-market, determine the redemption fulfillment option as at least one of shipping and in-store pickup.

In some embodiments, the circuitry configured to determine the redemption fulfillment option includes the circuitry being configured to: determine, based on the merchant location and the location of the consumer device, whether the consumer device is in-market or out-of-market relative to the merchant location; and in response to determining that the consumer device is out-of-market, determine the redemption fulfillment option as shipping.

Some embodiments may provide for a machine-implemented method, including: receiving, by circuitry of one or more servers and from a consumer device via a network, promotion purchase data indicating purchase of a promotion; determining, by the circuitry, a location of the consumer device; determining, by the circuitry, a redemption fulfillment option for the promotion, wherein the redemption fulfillment option includes at least one of shipping or in-store pickup; determining, by the circuitry, a merchant location of a merchant capable of fulfilling redemption of the promotion via the redemption fulfillment option, wherein the determination of the merchant location is based on, by the circuitry: accessing merchant location data defining one or more merchant locations from a merchant database; and comparing the one or more merchant locations with the location of the consumer device; and facilitating, by the circuitry, the redemption of the promotion with the merchant via the redemption fulfillment option.

In some embodiments, the method may further include receiving redemption fulfillment option data from the consumer device and wherein determining the redemption fulfillment option includes determining the redemption fulfillment option based on the redemption fulfillment option data.

In some embodiments, determining the merchant location capable of fulfilling the redemption of the promotion may include determining that the merchant location is a nearest merchant location to the consumer device capable of fulfilling the redemption of the promotion via the redemption fulfillment option.

In some embodiments, determining the redemption fulfillment option may include determining the redemption fulfillment option as shipping; and facilitating the redemption of the promotion with the merchant further may include providing shipping data to a merchant device associated with the merchant via the network.

In some embodiments, the method may further include providing, by the circuitry, redemption data to the consumer device, wherein the redemption data incudes one or more of a shipping timeline or return instructions.

In some embodiments, determining the redemption fulfillment option includes determining the redemption fulfillment option as in-store pickup; and facilitating the redemption of the promotion with the merchant includes: generating an instrument for the redemption of the promotion; and providing the instrument to the consumer device via the network.

In some embodiments, the method may further include providing, by the circuitry, redemption data to the consumer device, wherein the redemption data incudes one or more of redemption instructions and a redemption deadline.

In some embodiments, determining the redemption fulfillment option includes determining the redemption fulfillment option as in-store pickup; and facilitating the redemption of the promotion with the merchant includes: generating a promotion redemption identifier; providing, via the network, the promotion identifier to the consumer device via the network; and receiving, via the network, the promotion identifier from a merchant device associated with the merchant.

In some embodiments, the method may further include providing, by the circuitry, redemption data to the consumer device, wherein the redemption data incudes one or more of redemption instructions and a redemption deadline.

In some embodiments, determining the redemption fulfillment option includes determining the redemption fulfillment option as in-store pickup; and facilitating the redemption of the promotion with the merchant includes: generating a promotion redemption identifier; providing, via the network, the promotion identifier to the consumer device via the network; and receiving, via the network, the promotion identifier from a merchant device associated with the merchant.

In some embodiments, the determination of the merchant location may be further based on: providing, via the network, the one or more merchant locations to the consumer device; and subsequent to providing the one or more merchant locations to the consumer device, receiving redemption location data from the consumer device via the network, the redemption location data indicating a selection of the merchant location for the redemption of the promotion.

In some embodiments, determining the redemption fulfillment option may include determining the redemption fulfillment option as in-store pickup; and the method may further include, by the circuitry: determining, based on the location of the consumer device, whether the consumer device is within an in-store pickup notification distance of the merchant location; and in response to determining that the consumer device is within the in-store pickup notification distance of the merchant location, sending an in-store pickup notification to at least one of the consumer device and a merchant device associated with the merchant via the network.

In some embodiments, determining the redemption fulfillment option may include: determining, based on the merchant location and the location of the consumer device, whether the consumer device is in-market or out-of-market relative to the merchant location; and in response to determining that the consumer device is in-market, determining the redemption fulfillment option as at least one of shipping and in-store pickup.

In some embodiments, determining the redemption fulfillment option may include: determining, based on the merchant location and the location of the consumer device, whether the consumer device is in-market or out-of-market relative to the merchant location; and in response to determining that the consumer device is in-market, determining the redemption fulfillment option as at least one of shipping and in-store pickup.

Some embodiments may include circuitry and/or media configured to implement the methods and/or other functionality discussed herein. For example, one or more processors, and/or other machine components may be configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

BRIEF DESCRIPTION OF THE DRAWINGS

Figure 1:
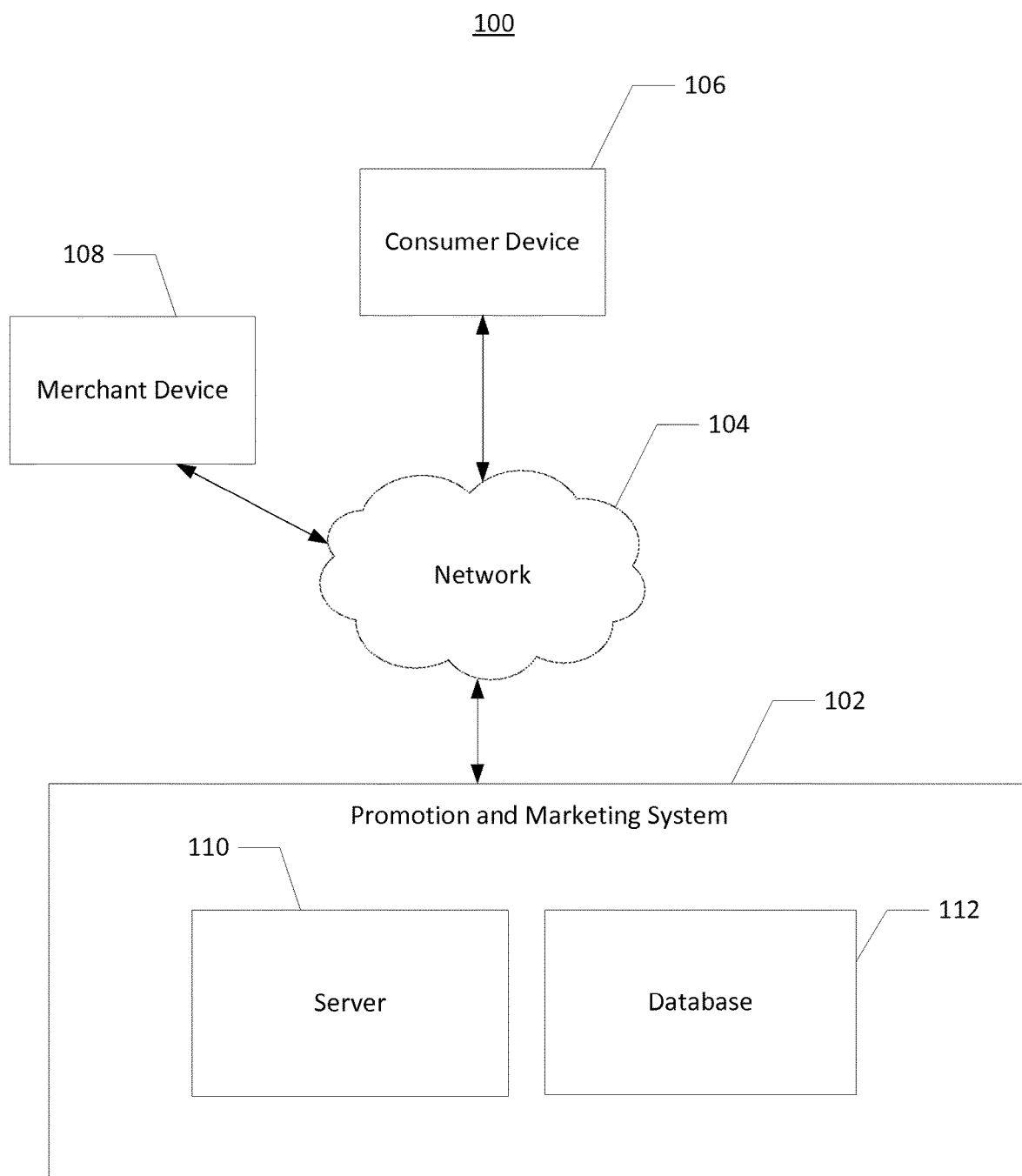
Figure 2:
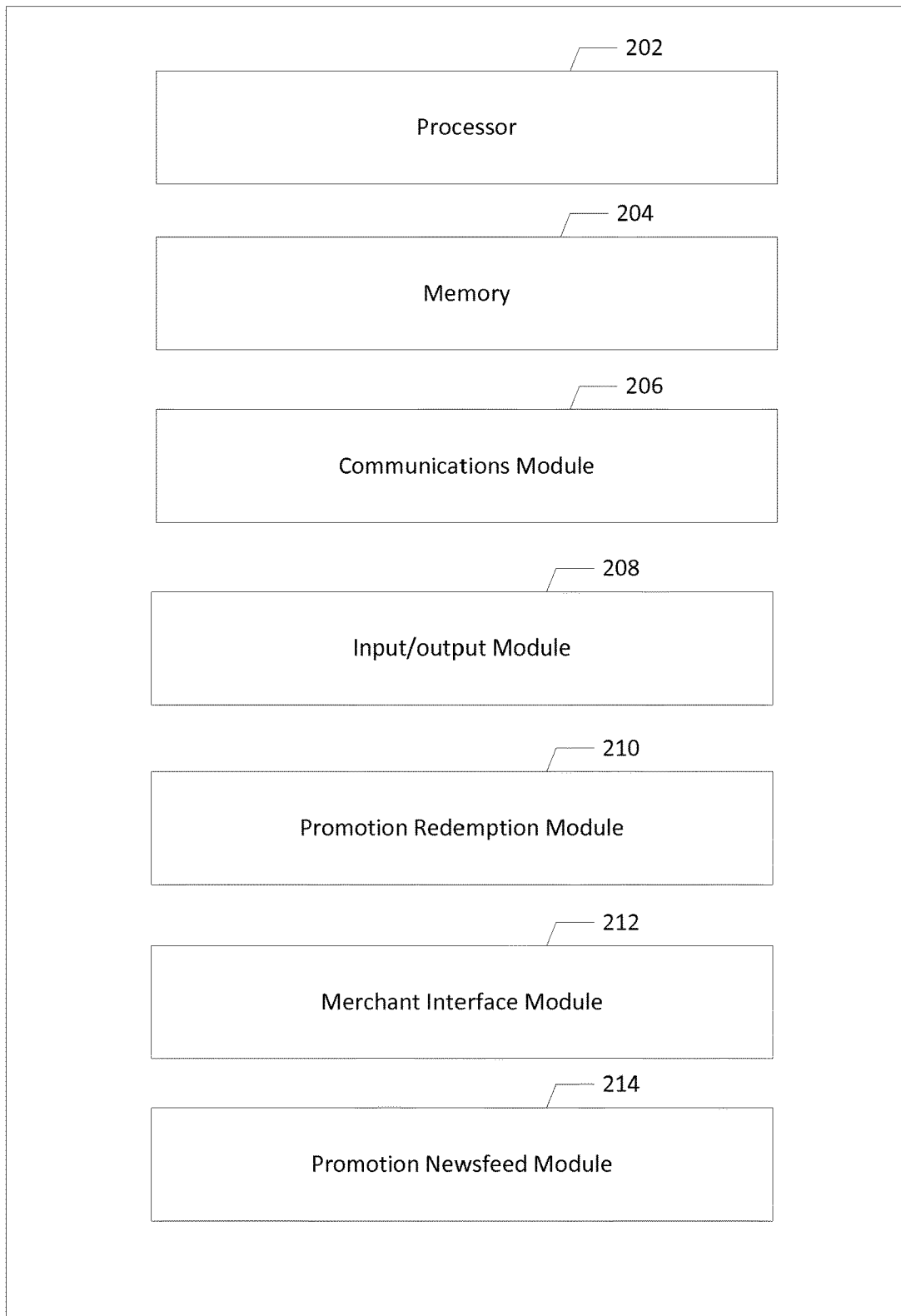
Figure 3:
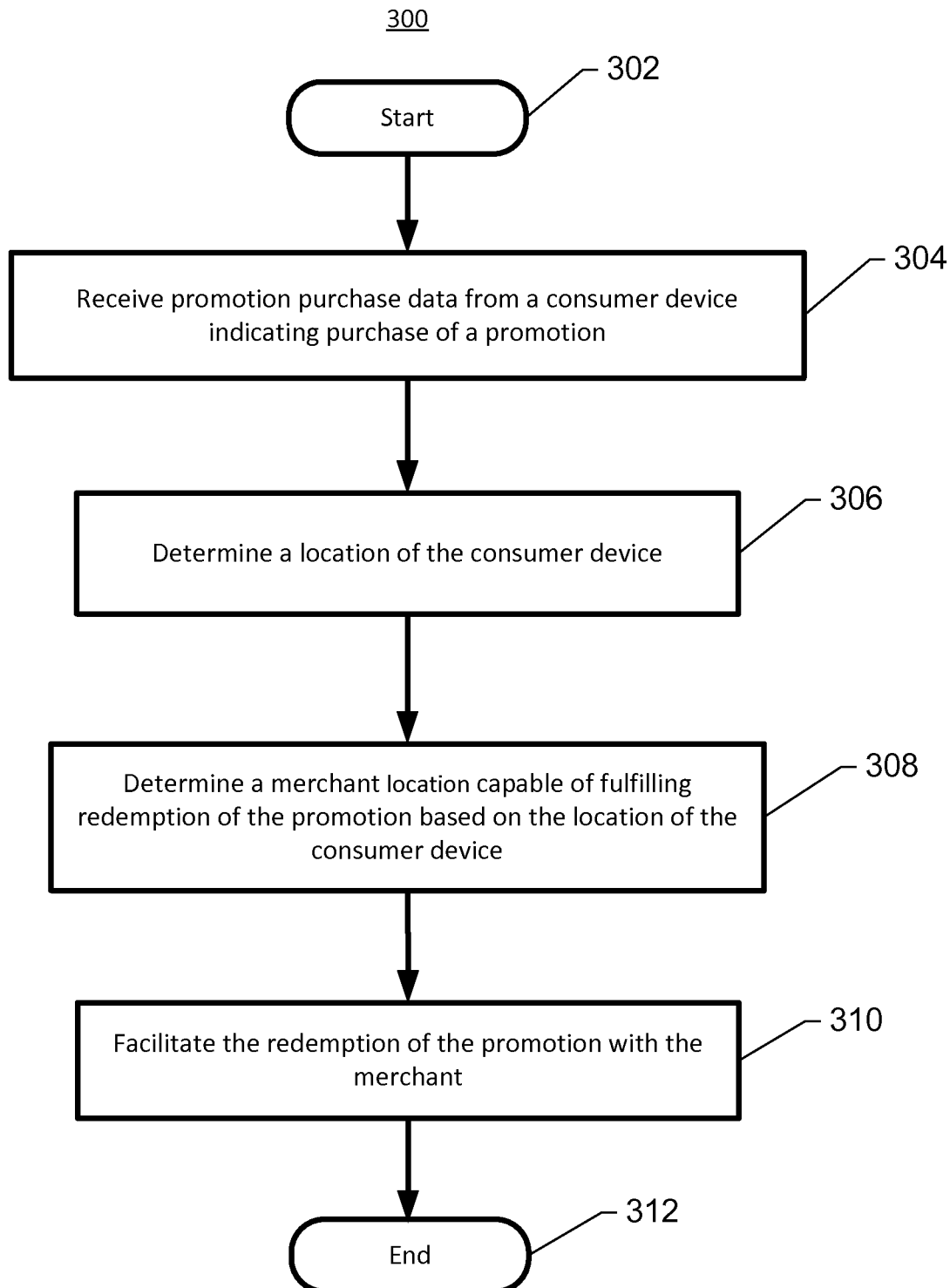
Figure 4:
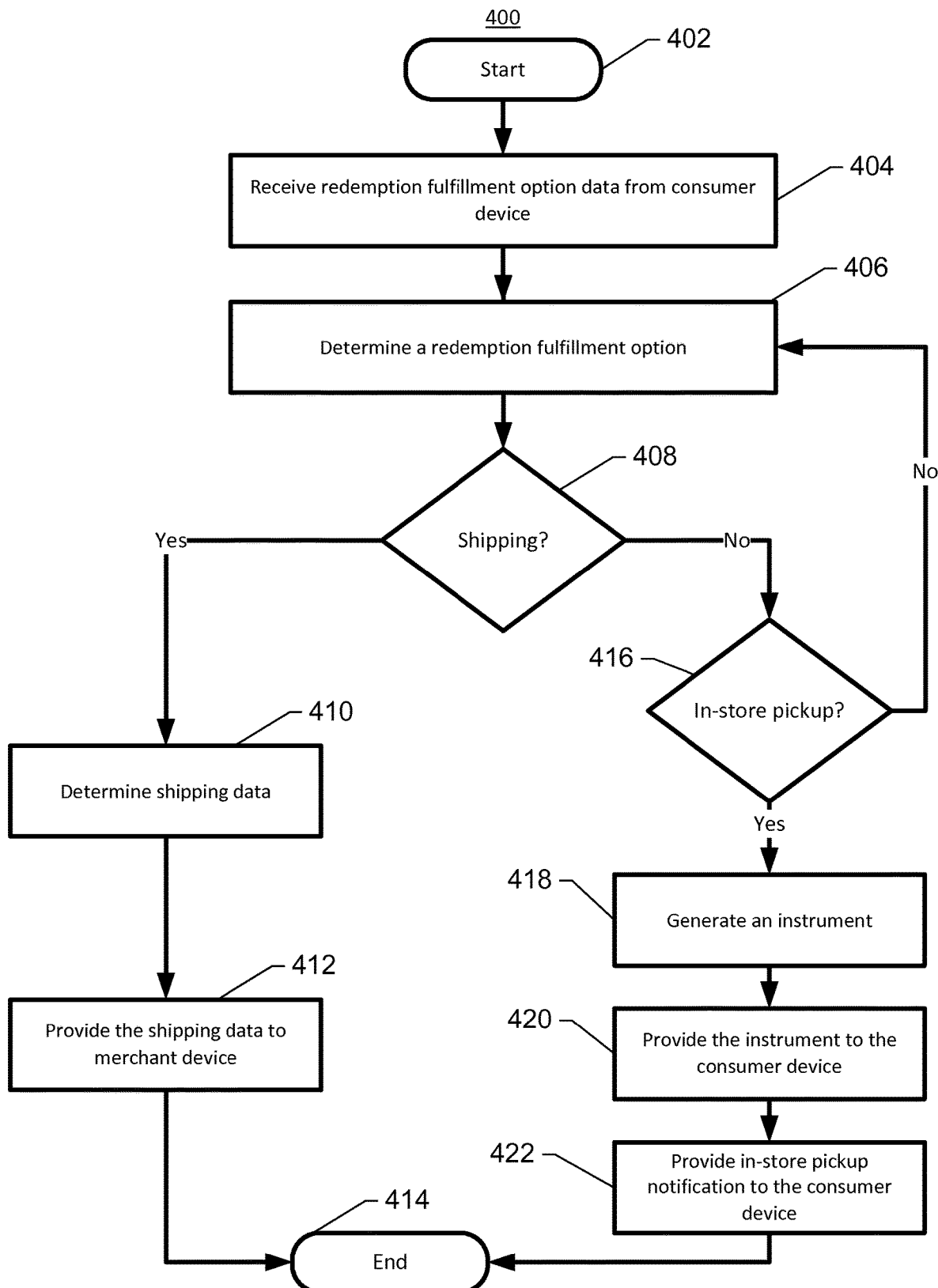
Figure 5:
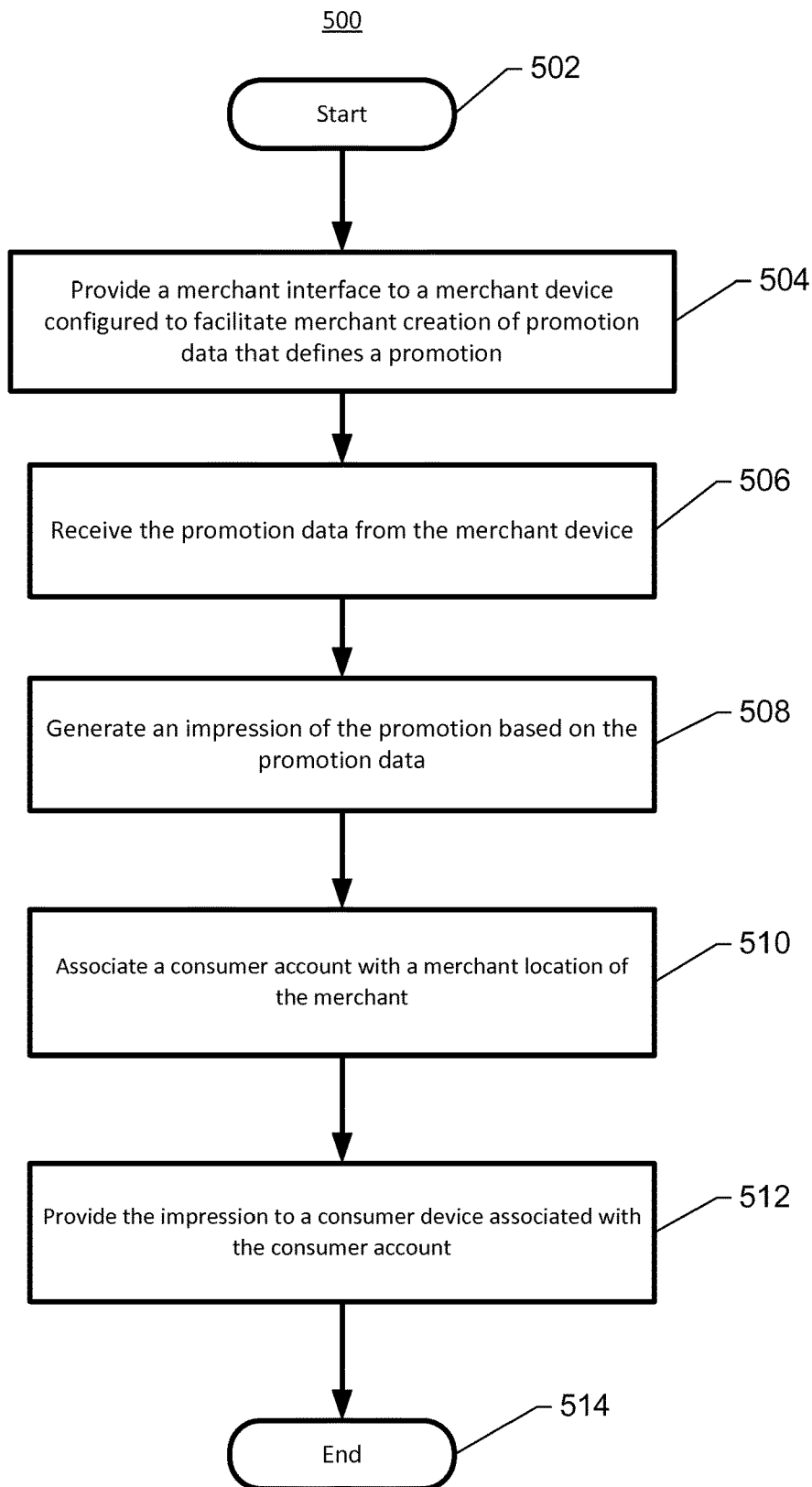
Figure 6:
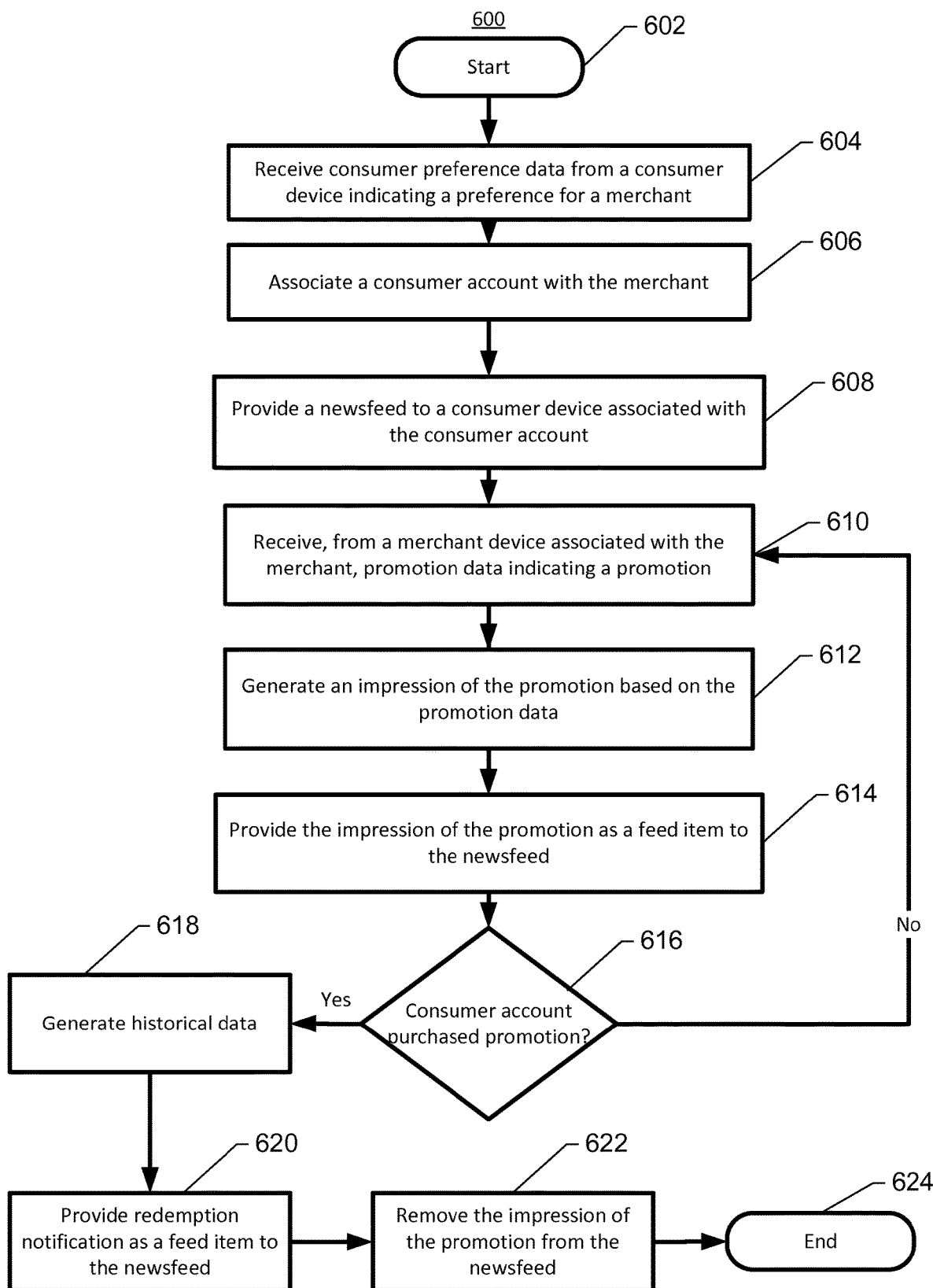

Having thus described some embodiments in general terms, reference will now be made to the accompanying drawings, which are not necessarily drawn to scale, and wherein:

FIG. 1 shows an example system in accordance with some embodiments;

FIG. 2 shows example circuitry in accordance with some embodiments;

FIG. 3 shows an example of a method for providing a promotion in accordance with some embodiments;

FIG. 4 shows an example of a method for facilitating promotion redemption in accordance with some embodiments;

FIG. 5 shows an example of a method for creating a promotion via a merchant interface in accordance with some embodiments; and FIG. 6 shows an example of a method for providing a promotion newsfeed to consumers in accordance with some embodiments.

DETAILED DESCRIPTION

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a device is described herein to receive data from another device, it will be appreciated that the data may be received directly from the another device or may be received indirectly via one or more intermediary devices, such as, for example, one or more servers, relays, routers, network access points, base stations, and/or the like, sometimes referred to herein as a "network." Similarly, where a device is described herein to send data to another device, it will be appreciated that the data may be sent directly to the another device or may be sent indirectly via one or more intermediary devices, such as, for example, one or more servers, relays, routers, network access points, base stations, and/or the like.

As used herein, the term "method" refers to one or more steps that may be performed by a device, apparatus, system, circuitry, one or more processors, or the like. Where an example method is shown as including more than one step, it will be appreciated that the steps may be performed in different orders than as shown in the example and that not all steps are necessarily required. Furthermore, the methods are described herein as being performed by example structures for clarity and are not limited to those structures (e.g., a particular server, device, apparatus, etc.) in some embodiments.

Brief Overview

Methods, systems, apparatus and computer program products described herein are operable for providing promotions to consumers based on location. For example, some embodiments may provide for a network of merchants (e.g., including brick-and-mortar locations) and a central system that provides a promotional and marketing service to each of the merchants. The system may be configured to provide a cloud-based platform that, among other things, programmatically assists the merchant in promotion creation, advertising, sales, and redemption. A "promotion," as used herein, may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion.

Some embodiments may include a system configured to provide an impression of a promotion to consumer devices, such as for advertising or otherwise communicating the promotion. An "impression," as used herein, may include a communication, a display, or other perceived indication, such as a flyer, print media, e-mail, text message, application alert, mobile applications, other type of electronic interface or distribution channel and/or the like, of one or more promotions.

In some embodiments, the impression of the promotion may be included in one or more newsfeeds that can be provided to consumer devices. The newsfeeds may be topical and may be populated with relevant feed items including impressions. Some example newsfeeds may include consumer newsfeeds including feed items relevant to a particular consumer, merchant newsfeeds including feed items of a merchant, location-based newsfeeds including feed items redeemable within a particular geographic location, among other things. Via the impression, consumers may be allowed to purchase promotions for redemption.

Some embodiments may provide for a system configured to provide location-based redemption. For example, subsequent to a promotion purchase, the system may be configured to determine the location of a consumer device and merchants capable of providing redemption. Based on the location of the consumer, among other things, the system may allow the consumer to select from various redemption fulfillment options. Some example redemption fulfillment options can include shipping and in-store pickup. The system may be further configured to facilitate merchant performance of the redemption based on the various redemption fulfillment options, as discussed in greater detail herein.

Some embodiments may provide for a merchant interface for generating a promotion. The merchant interface may be provided to merchant devices such that merchants can generate promotions and publish impressions (e.g., to a newsfeed among other communication channels) via a self-service interface. In some embodiments, the merchant interface may allow the merchant to provide promotion data capable of allowing the system to facilitate merchant performance of the redemption.

Exemplary System Architecture

FIG. 1 shows an example system 100 in accordance with some embodiments. System 100 may include promotion and marketing system 102 (or "system 102"), network 104, consumer device 106, and merchant device 108. System 102 may be communicably connected with consumer device 106 and merchant device 108 via network 104. System 102 may include server 110 and database 112.

Server 110 may include circuitry, networked processors, or the like configured to perform some or all of the server-based processes described herein and may be any suitable network server and/or other type of processing device. In some embodiments, system 102 may function as a "cloud"

with respect to the consumer device 106 and/or merchant device 108. In that sense, server 110 may include several servers performing interconnected and/or distributed functions. To avoid unnecessarily overcomplicating the disclosure, server 110 is shown and described herein as a single server.

Database 112 may be any suitable network storage device configured to store some or all of the information described herein. For example, database 112 may be configured to store consumer information, merchant information, and/or promotion information. As such, database 112 may include, for example, one or more database systems, backend data servers, network databases, cloud storage devices, etc. To avoid unnecessarily overcomplicating the disclosure, database 112 is shown and described herein as a single database.

Network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (such as, e.g., network routers, switches, hubs, etc.). For example, network 104 may include a cellular telephone, mobile broadband, long term evolution (LTE), GSM/EDGE, UMTS/HSPA, IEEE 802.11, IEEE 802.16, IEEE 802.20, WiFi, dial-up, and/or WiMax network. Furthermore, network 104 may include a public network, such as the Internet, a private network, such as an intranet, or combinations thereof, and may utilize a variety of networking protocols now available or later developed including, but not limited to TCP/IP based networking protocols.

Consumer device 106 may be associated with a consumer and/or consumer account, such as a consumer with a consumer account provided by system 102. Although a single consumer device 106 is shown, system 100 may include any number of consumer devices that may be associated with various other consumers and/or consumer accounts. Consumer device 106 may be a mobile device and/or a stationary device. For example, consumer device 106 may be a mobile device such as a cellular telephone (including smartphones and/or other types of mobile telephones), laptop, tablet, electronic reader, e-book device, media device, and/or the like. Additionally and/or alternatively, consumer device 106 may be a stationary device such as a desktop computer, work station, or the like.

Merchant device 108 may be associated with a merchant and/or provider of promotions. Although a single merchant device 108 is shown, system 100 may include any number of merchant devices that may be associated with various other merchants. In some embodiments, merchant device 108 may be configured to provide point-of-sale (POS) functionality for the merchant, such as at the merchant's shop. Furthermore, merchant device 108 may be a stationary and/or mobile device. In some embodiments, merchant device 108 may be configured to provide promotion data to system 102. The promotion data may indicate a promotion for one or more goods, experiences and/or services and/or one or more parameters of the promotion (e.g., target audience, timing, purchase value, promotional value, residual value, etc.). System 102 may then generate and/or provide one or more impressions for the promotion to consumer device 106.

In some embodiments, server 110 may be configured to facilitate the redemption of a promotion with a merchant. Redemption can be provided for in a number of ways including in-store pickup (e.g., by the consumer at a brick-and-mortar merchant shop) and/or shipping (e.g., by mail). For example, server 110 may be configured to determine the location of consumer device 102 as well as the location of one or more merchants capable of fulfilling the redemption. Server 110 may be further configured to facilitate redemption of the promotion. For in-store pickup, for example, server 110 may be configured to provide an instrument to consumer device 106. An "instrument," as used herein, may include, but is not limited to, any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In the example of shipping, server 110 may be configured to provide shipping data, such as consumer address, shipping cost, shipping label data, etc., to merchant device 108.

In some embodiments, server 110 and/or merchant device 108 may be configured to provide a merchant interface configured to facilitate merchant creation of the promotion data that defines a promotion. The merchant interface may be interactive and may include one or more graphical and/or audio displays that prompt the merchant to enter requested promotion data. Merchant device 108 may be configured to receive the promotion data (e.g., entered via a user input device) and to provide the promotion data to server 110, such as via network 104.

In some embodiments, the promotion data may define the good, experience and/or service of the promotion. For example, where the promotion is for an item, the promotion data may include characteristics of the item, such as a stock keeping unit (SKU), price, availability, weight, and/or size of the item. In another example, where the promotion is for an experience and/or service, the promotion data may include characteristics of the experience and/or service such as price, timing, availability, etc. In some embodiments, the promotion data may additionally or alternatively define one or more merchant locations capable of providing redemption of the promotion via in-store pickup and/or via shipping, and/or related data to facilitate the in-store pickup and/or shipping.

In some embodiments, server 110 and/or merchant device 108 may be configured to provide impressions of promotions to consumers via a feed item within one or more newsfeeds. For example, the newsfeed may be provided to consumers via an application, webpage, among other things. Consumer accounts may be associated with merchants (and/or their promotions) based on various criteria (e.g., user preference data, purchase history, profile data, location, etc.) such that relevant feed items can be provided to consumer device 106. In some embodiments, consumers may be able to browse and purchase promotions via a feed item. Consumer purchases may be tracked as historical data and subsequently used to inform future feed items based on personal relevance.

FIG. 2 shows a schematic block diagram of example circuitry 200, some or all of which may be included in system 102, server 110, database 112, user device 106, and merchant device 108. In accordance with some example embodiments, circuitry 200 may include various means, such as one or more processors 202, memories 204, communications modules 206, and/or input/output modules 208.

In some embodiments, such as when circuitry 200 is included in system 102 and/or merchant device 108, promotion redemption module 210, merchant interface module 212, and/or promotion newsfeed module 214 may also or instead be included. As referred to herein, "module" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 204) that is executable by a suitably configured processing device (e.g., processor 202), or some combination thereof.

Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments, processor 202 may comprise a plurality of processing means. The plurality of processing means may be embodied on a single computing device or may be distributed across a plurality of computing devices collectively configured to function as circuitry 200. The plurality of processing means may be in operative communication with each other and may be collectively configured to perform one or more functionalities of circuitry 200 as described herein. In an example embodiment, processor 202 may be configured to execute instructions stored in memory 204 or otherwise accessible to processor 202. These instructions, when executed by processor 202, may cause circuitry 200 to perform one or more of the functionalities described herein.

Whether configured by hardware, firmware/software methods, or by a combination thereof, processor 202 may comprise an entity capable of performing operations according to embodiments of the present invention while configured accordingly. Thus, for example, when processor 202 is embodied as an ASIC, FPGA or the like, processor 202 may comprise specifically configured hardware for conducting one or more operations described herein. As another example, when processor 202 may be embodied as an executor of instructions, such as may be stored in memory 204, the instructions may specifically configure processor 202 to perform one or more algorithms, methods or operations described herein. For example, processor 202 may be configured to execute operating system applications, firmware applications, media playback applications, media editing applications, among other things.

Memory 204 may comprise, for example, volatile memory, non-volatile memory, or some combination thereof. Although illustrated in FIG. 2 as a single memory, memory 204 may comprise a plurality of memory components. The plurality of memory components may be embodied on a single computing component or distributed across a plurality of computing components. In various embodiments, memory 204 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 204 may be configured to store information, data, applications, instructions, or the like for enabling circuitry 200 to carry out various functions in accordance with example embodiments discussed herein. For example, in at least some embodiments, memory 204 may be configured to buffer input data for processing by processor 202. Additionally or alternatively, in at least some embodiments, memory 204 may be configured to store program instructions for execution by processor 202 and/or data for processing by processor 202. Memory 204 may store information in the form of static and/or dynamic information. This stored information may be stored and/or used by circuitry 200 during the course of performing its functionalities.

Communications module 206 may be embodied as any component or means embodied in circuitry, hardware, a computer program product comprising computer readable program instructions stored on a computer readable medium (e.g., memory 204) and executed by a processing device (e.g., processor 202), or a combination thereof that is configured to receive and/or transmit data from/to another device, such as, for example, a second circuitry 200 and/or the like. In some embodiments, communications module 206 (like other components discussed herein) can be at least partially embodied as or otherwise controlled by processor 202. In this regard, communications module 206 may be in communication with processor 202, such as via a bus. Communications module 206 may include, for example, an antenna, a transmitter, a receiver, a transceiver, network interface card and/or supporting hardware and/or firmware/software for enabling communications. Communications module 206 may be configured to receive and/or transmit any data that may be stored by memory 204 using any protocol that may be used for communications. Communications module 206 may additionally and/or alternatively be in communication with the memory 204, input/output module 208 and/or any other component of circuitry 200, such as via a bus. Communications module 206 may be configured to use one or more communications protocols such as, for example, short messaging service (SMS), Wi-Fi (e.g., a 802.11 protocol, Bluetooth, etc.), radio frequency systems (e.g., 900 MHz, 1.4 GHz, and 5.6 GHz communication systems), infrared, GSM, GSM plus EDGE, CDMA, quad-band, and other cellular protocols, VOIP, or any other suitable protocol Input/output module 208 may be in communication with processor 202 to receive an indication of an input and/or to provide an audible, visual, mechanical, or other output. In that sense, input/output module 208 may include means for performing analog-to-digital and/or digital-to-analog data conversions. Input/output module 208 may include support, for example, for a display, touch screen, keyboard, button, click wheel, mouse, joystick, an image capturing device, microphone, speaker, biometric scanner, and/or other input/output mechanisms. In embodiments where circuitry 200 may be implemented as a server or database, aspects of input/output module 208 may be reduced as compared to embodiments where circuitry 200 may be implemented as an end-user machine or other type of device designed for complex user interactions. In some embodiments (like other components discussed herein), input/output module 208 may even be eliminated from circuitry 200. Alternatively, such as in embodiments wherein circuitry 200 is embodied as a server or database, at least some aspects of input/output module 208 may be embodied on an apparatus used by a user that is in communication with circuitry 200. Input/output module 208 may be in communication with memory 204, communications module 206, and/or any other component(s), such as via a bus. Although more than one input/output module and/or other component can be included in circuitry 200, only one is shown in FIG. 2 to avoid overcomplicating the disclosure (e.g., like the other components discussed herein).

In some embodiments, promotion redemption module 210, merchant interface module 212, and/or promotion newsfeed module 214 may also or instead be included and configured to perform the functionality discussed herein related providing promotion redemptions, the merchant interface, and the promotion newsfeed. In some embodiments, some or all of the functionality of promotion redemption module 210, merchant interface module 212, and/or promotion newsfeed module 214 may be performed by processor 202. In this regard, the example processes and algorithms discussed herein can be performed by at least one of processor 202, promotion redemption module 210, merchant interface module 212, and/or promotion newsfeed module 214. For example, non-transitory computer readable storage media can be configured to store firmware, one or more application programs, and/or other software, which include instructions and other computer-readable program code portions that can be executed to control processors of the components of system 200 to implement various operations, including the examples shown herein. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to block diagrams of components, such as functional modules, system components and circuitry. Below is a discussion of an example process flowcharts describing functionality that may be implemented by one or more components discussed above. Each block of the block diagrams and process flowcharts, and combinations of blocks diagrams and process flowcharts, respectively, can be implemented by various means including computer program instructions. These computer program instructions may be loaded onto a general purpose computer, special purpose computer, or other programmable data processing apparatus, such as processor 202, to produce a machine, such that the computer program product includes the instructions which execute on the computer or other programmable data processing apparatus to create a means for implementing the functions specified in the flowchart block or block diagrams.

These computer program instructions may also be stored in a computer-readable storage device (e.g., memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions.

Providing Local Promotions

FIG. 3 shows an example of a method for providing a promotion in accordance with some embodiments. Method 300 is described as being performed by system 102 (e.g., server 110), however, other suitable structures (e.g., one or more servers, a networked device, hardware, software, firmware, circuitry, merchant device 108, etc.) may also be used in various embodiments.

Method 300 may start at 302 and proceed to 304, where server 110 may be configured to receive promotion purchase data from a consumer device indicating purchase of a promotion. As discussed in greater detail below, server 110 may be configured to provide impressions of promotions to consumers. The impressions may be targeted to consumers based on consumer information known to system 102 such as consumer data related to consumer interest, preferences, purchase histories, browsing histories, and/or location.

An impression may be provided to consumer devices via any suitable communication channel, such as one or more of email, webpage, text message, application alert, merchant online storefronts, newsfeeds (e.g., social networking newsfeeds, consumer newsfeeds, merchant newsfeeds, etc.), among other things. Depending on the communication channel, the impression may include user interfaces and/or references to such user interfaces that allow the consumer to purchase one or more promotions within the impression via a consumer device (and/or any other promotion provided by system 102). As such, consumer device 106 may be configured to generate and provide the promotion purchase data to server 110 via network 104.

At 306, server 110 may be configured to determine a location of the consumer device. The location of the consumer device may be determined using any suitable technique. For example, the determination may be based on one or more of Internet Protocol (IP) address (e.g., of the consumer device), cell-tower triangulation, global positioning system (GPS), and/or a wireless personal area network (PAN) (e.g., based on consumer device 106 being in communicable range of a beacon and/or merchant device) may be used to determine the location of the consumer device. In some embodiments, server 110 may be configured to receive location data from consumer device 106 indicating the location of the consumer device.

At 308, server 110 may be configured to determine a merchant location capable of fulfilling redemption of the promotion based on the location of the consumer device. As discussed in greater detail in method 400 as shown in FIG. 4, server 110 may be configured to provide for a plurality of redemption fulfillment options (e.g., in-store pickup or shipping) for redeeming the promotion. Different merchant locations may be determined to be more optimal or otherwise given priority based on the location of the consumer (e.g., determined via the location of the consumer device), the characteristics of the merchant location (e.g., whether the merchant location is equipped to provide in-store pickup, shipping, etc.) and/or the redemption fulfillment option.

A merchant location may include a merchant retail storefront (e.g., a restaurant, spa, retail store, etc.), merchandise storage (e.g., a warehouse, shipping facility, etc.), and/or any other locations capable of providing promotion redemption.

Some embodiments may provide for techniques for determining a merchant location from a plurality of potential merchant locations. For example, server 110 may be configured to determine the nearest merchant location to the consumer device capable of fulfilling the redemption of the promotion.

In some embodiments, server 110 may be configured to determine a plurality of merchant locations capable of fulfilling the redemption. For example, location data indicating the location of merchants may be stored in database 112 and accessed by server 110. Dynamic techniques may also be used where merchant devices may be configured to provide their location to system 102 (e.g., in real-time, on a schedule basis, etc.). Server 110 may be configured to provide a user interface to the consumer device for selecting a merchant location from the plurality of merchant locations. The interface may include an index and/or listing of merchant locations that may be selected by the user. In some embodiments, the listing may be ordered, such as by distance from the consumer device. Subsequent to providing the plurality of merchants to the consumer device, server 110 may receive redemption location data from the consumer device indicating selection of a merchant location for the redemption of the promotion.

At 310, server 110 may be configured to facilitate the redemption of the promotion with the merchant. For example, server 110 may be configured to generate an instrument (e.g., an electronic certificate) that may be sent to the consumer device and presented to a merchant during in-store pickup (and/or other on-location redemptions such as dining at a restaurant, a spa or massage, skydiving, etc.). In another example, server 110 may be configured to provide data associated with redemption directly to a merchant, such as for redemptions performed via shipping from the merchant location. Method 300 may then end at 312.

FIG. 4 shows an example of a method 400 for facilitating promotion redemption in accordance with some embodiments. Method 400 is described as being performed by system 102 (e.g., server 110), however, other suitable structures (e.g., one or more servers, a networked device, hardware, software, firmware, circuitry, promotion redemption module 210, merchant device 108, etc.) may also be used in various embodiments. In some embodiments, method 400 may be performed at 308-310 of method 300.

Method 400 may start at 402 and proceed to 404, where server 110 may be configured to receive redemption fulfillment option data from the consumer device. For example, the redemption fulfillment option data may be received in connection with promotion purchase data (e.g., at 304 of method 300) during purchase of the promotion.

In some embodiments, server 110 may be configured to provide redemption fulfillment options to the consumer device. A promotion may be associated with various redemption fulfillment options such as in-store pickup, shipping, or the like. For example, the redemption fulfillment options may be provided to server 110 by merchant device 108, such as in connection with providing promotion data that defines the promotion. Via the redemption fulfillment option, the merchant is able to deliver on the good, experience, or service of the promotion that the consumer has purchased in a suitable manner.

At 406, server 110 may be configured to determine a redemption fulfillment option. In some embodiments, server 110 may be further configured to receive redemption fulfillment option data from consumer device 106 indicating a consumer selected redemption fulfillment option. The consumer selected redemption fulfillment option may then be used to facilitate the redemption.

In some embodiments, the redemption fulfillment option may be programmatically determined (e.g., fully or at least partially) based on the merchant location. For example, server 110 may be configured to determine the redemption fulfillment option by determining whether the consumer device is in-market or out-of-market relative to the merchant location. In response to determining that the consumer device is in-market, server 110 may be configured to allow the consumer to select at least one of shipping and in-store pickup. In response to determining that the consumer device is out-of-market, server 110 may be configured to allow shipping (e.g., at least as recommended and/or default selections). A consumer device may be determined to be in-market vs. out-of-market using various techniques. For example, the distance between the consumer device and the merchant location may be compared with a predetermined threshold.

At 408, server 110 may be configured to determine whether the redemption fulfillment option is shipping. In response to determining that the redemption fulfillment option is shipping, method 400 may proceed to 410, where server 110 may be configured to determine shipping data. For example, the shipping data may include the merchant location (e.g., sender address), address of the consumer (e.g., which may be stored as consumer data in database 112), weight of an item, size of an item, shipping cost. Item characteristics applicable to shipping may be stored in database 112 and/or provided to server 110 from merchant device 118 as promotion data. In some embodiments, server 110 may be further configured to generate shipping label data that can be printed to an adhesive medium for delivery tracking.

At 412, server 110 may be configured to provide the shipping data to a merchant device. For example, the shipping data may be provided to merchant device 108 via network 104. Based on receiving the shipping data, the merchant device may be configured to initiate order processing functionality to prepare the shipment. In some embodiments, for example, merchant device 108 may be configured to print a shipping label based on shipping label data generated by server 110. In some embodiments, server 110 may be configured to provide redemption data to the consumer device. The redemption data may include a redemption confirmation, order confirmation, shipping timeline, tracking data, and/or return instructions. Method 400 may then proceed to 414 and end.

Returning to 408, in response to determining that the redemption fulfillment option is not shipping, method 400 may proceed to 416, where server 110 may be configured to determine whether the redemption fulfillment option is in-store pickup.

In response to determining that the redemption fulfillment option is not in-store pickup, method 400 may return to 406, where server 110 may be configured to determine a different redemption fulfillment option. For example, another redemption fulfillment option may include electronic delivery, such as promotions associated with electronic content such as games, music, videos, etc.

Returning to 416, in response to determining that the redemption fulfillment option is in-store pickup, method 400 may proceed to 418, where server 110 may be configured to generate an instrument. As discussed above, the instrument can take various forms, and may be an electronic certificate or digital voucher. Additional details regarding in-store pickup of goods for promotions are discussed in U.S. Provisional Patent Application No. 61/866,026, titled "Configuring Promotions for Local Pickup of Goods," filed Aug. 14, 2013, which is incorporated by reference herein in its entirety.

At 420, server 110 may be configured to provide the instrument to the consumer device. For example, the instrument may be provided to consumer device 106 such that the consumer can present the instrument to the merchant during the in-store pickup.

In some embodiments, the instrument may include a key, code, barcode, or other promotion identifier. The promotion identifier may uniquely identify a particular purchase of the promotion. In some embodiments, server 110 may be configured to generate the promotion identifier, provide the promotion identifier to the consumer device, and trigger redemption upon receipt of the promotion identifier from the merchant device (e.g., indicating that the consumer has provided the promotion identifier in connection with the in-store pickup).

At 422, server 110 may be configured to provide an in-store pickup notification to the consumer device. The in-store pickup notification may indicate to the consumer that the in-store pickup has been prepared, such as for a menu item of a restaurant. In some embodiments, server 110 may be configured to provide in-store pickup notifications based on location of the consumer device. For example, server 110 may be configured monitor the location of the consumer device and to determine whether the consumer device is within pickup notification distance (e.g., 1, 2, 5, miles etc.) of the merchant location. In response to determining that the consumer device is within the in-store pickup notification distance of the merchant location, server 110 may be configured to send an in-store pickup notification to the consumer device, such as to remind the user of a nearby redemption location for purchased promotions. Additionally or alternatively, server 110 may be configured to send the in-store pickup notification the merchant device, such as to trigger order preparation by the merchant.

In some embodiments, the consumer may be notified when the merchant has prepared the in-store pickup. For example, server 110 may be configured to provide order data associated with the promotion to a merchant device associated with the merchant (or merchant location). Server 110 may then receive an order ready confirmation from the merchant device. In response to receiving the order ready confirmation from the merchant device, server 110 may be configured to send an in-store pickup notification to the consumer device. Method 400 may then proceed to 414 and end.

FIG. 5 shows an example of a method 500 for creating a promotion via a merchant interface in accordance with some embodiments. Method 500 is described as being performed by system 102 (e.g., server 110), however, other suitable structures (e.g., one or more servers, a networked device, hardware, software, firmware, circuitry, merchant interface module 212, merchant device 108, etc.) may also be used in various embodiments. In some embodiments, method 500 may be performed prior to method 300.

Method 500 may start at 502 and proceed to 504, where server 110 may be configured to provide a merchant interface to a merchant device configured to facilitate merchant creation of promotion data that defines a promotion. For example, the merchant interface may be provided to merchant device 108 to facilitate the creation of promotions.

At 506, server 110 may be configured to receive the promotion data from the merchant device. As discussed above, the promotion purchase data may define the parameters of the promotion, such as a product, service, or experience of the promotion. Where the promotion is for a product, the promotion data may define the product and at least one of: a stock keeping unit, availability, weight, size of the product, one or more images and/or videos of the product, among other things.

In some embodiments, the promotion data may define one or more merchant locations capable of providing redemption of the promotion via in-store pickup. For example, the merchant may be allowed to select and/or otherwise specify one or more merchant locations capable of promotion redemption. For example, a merchant may include a large number of merchant locations, such as across states, and may specify one or more of the merchant locations via the merchant interface. In some embodiments, the promotion data may additionally or alternatively define one or more merchant locations capable of providing redemption of the promotion via shipping.

In some embodiments, in response to receiving the promotion data from the merchant device, server 110 may be configured to confirm that the merchant has approved publishing of the promotion to consumers prior to publishing the promotion (e.g., providing impressions to consumers). For example, server 110 may be configured to, in response to receiving the promotion data from the merchant device, send a confirmation request to the merchant device to publish the promotion. The confirmation request may include promotion details of the promotion generated based on the promotion data received from the merchant device. In some embodiments, the promotion details may include a shipping cost associated with the promotion (e.g., of an item). Server 110 may be configured to determine the shipping cost based on at least one of a weight and size of a product defined by the promotion data.

At 508, server 110 may be configured to generate an impression of the promotion based on the promotion data. As discussed above, an impression may include a communication, a display, or other perceived indication, such as a flyer, print media, e-mail, text message, application alert, mobile applications, other type of electronic interface or distribution channel and/or the like, of one or more promotions.

At 510, server 110 may be configured to associate a consumer account with a merchant location of the merchant. For example, server 110 may be configured to determine the location of the consumer device. Server 110 may further be configured to compare the location of the consumer device with one or more merchant locations capable of providing redemption of the promotion (e.g., as defined by the promotion data provided via the merchant interface).

At 512, server 110 may be configured to provide the impression to a consumer device associated with the consumer account. The discussion at 304 of method 300 may be applicable at 512. In some embodiments, the impression may be provided via a feed item of a newsfeed, as discussed in greater detail below in connection with method 600 and FIG. 6. Method 500 may then proceed to 514 and end.

FIG. 6 shows an example of a method 600 for providing a promotion newsfeed to consumers in accordance with some embodiments. Method 600 is described as being performed by system 102 (e.g., server 110), however, other suitable structures (e.g., one or more servers, a networked device, hardware, software, firmware, circuitry, promotion newsfeed module 214, merchant device 108, etc.) may also be used in various embodiments.

Method 600 may begin at 602 and proceed to 604, where server 110 may be configured to receive consumer preference data from a consumer device indicating a preference for a merchant. The consumer preference data may include consumer account data, consumer profile data, consumer purchase data, consumer merchant review data, and/or social networking data (e.g., indicating that the consumer is interested in a merchant and/or a promotion of the merchant). In some embodiments, the consumer preference data may be stored in database 112 and accessed to associate consumers with relevant merchants.

At 606, server 110 may be configured to associate a consumer account (e.g., associated with the consumer device) with the merchant. For example, the consumer account may be associated with the merchant based on the consumer preference data received from the consumer device and/or database 112. In some embodiments, a consumer account may be associated with the merchant based on receiving a request from the consumer device to access a newsfeed, webpage (e.g., online storefront), and/or receiving some other indication of consumer interest from the consumer device.

At 608, server 110 may be configured to provide a newsfeed to a consumer device associated with the consumer account. The consumer device may be the same consumer device as discussed at 604, or may be a different consumer device. A newsfeed may comprise one or more feed items. In general, newsfeeds may be defined for various purposes and feed items that are determined to be relevant to a newsfeed may be provided to the newsfeed. In some embodiments, as discussed in further detail below, a feed item may include an impression of a promotion. Additionally or alternatively, feed items may include other types of communications such as merchant announcements or news, advertisements, and/or messages by consumers (e.g., provided via consumer accounts).

In some embodiments, server 110 may be configured to provide a consumer newsfeed. Feed items including impression of merchants associated with a consumer account may be provided to the consumer newsfeed of the consumer account. In some embodiments, a consumer may be allowed to select merchants to "follow." Server 110 may be configured to provide feed items of each merchant followed by the consumer account to the consumer newsfeed.

Additionally or alternatively, server 110 may be configured to provide a merchant newsfeed. Feed items associated with a merchant may be provided to the merchant newsfeed of the merchant. Other types newsfeeds may include location-based newsfeeds, merchant and/or promotion category-based newsfeeds (e.g., newsfeeds for promotions for restaurant meals), among other things. A location-based newsfeed, for example, may include feed items including impressions of promotions of merchants in a particular geographic area. In that sense, server 110 may be configured to provide location-based targeting of impressions to ensure that redemption fulfillment option (e.g., in-store pickup) are available to the consumer.

In some embodiments, server 110 may be configured to provide social networking functionality for consumer accounts. For example, each consumer account may be associated with consumer profile data, social networking data (e.g., friends, contacts, group membership, merchant preferences, etc.), and a consumer newsfeed. Consumer accounts may be associated with each other (e.g., as contacts). Server 110 may be further configured to provide consumer newsfeeds of other consumer accounts to the consumer device. In that sense, some embodiments may allow for consumers to share consumer newsfeeds, where the newsfeed includes feed items including impressions of promotions, among other things (e.g., social networking messages, merchant reviews, etc.).

At 610, server 110 may be configured to receive, from a merchant device associated with the merchant, promotion data indicating a promotion. At 612, server 110 may be configured to generate an impression of the promotion based on the promotion data. In some embodiments, the discussion at 506 and 508 of method 500 may be applicable to 610 and 612. For example, the promotion data may be received from the merchant device subsequent to being generated via a merchant interface.

At 614, server 110 may be configured to provide the impression of the promotion as a feed item to the newsfeed. The newsfeed may include a plurality of feed items. In some embodiments, server 110 may be configured to order the feed items within the newsfeed, such as based on feed item creation time. Additionally or alternatively, feed items may be ordered based on promotion availability period (e.g., a time frame within which promotion is offered to consumers), promotion creation time, a promotion redemption time, a promotion feature period (e.g., time frame within which promotion is featured or prioritized), promotion purchase count (e.g., number of purchases by consumers), promotion access/click-through rate, promotion popularity, among other things.

In some embodiments, feed items including impressions may be stored by system 102 (e.g., within memory 112) and used in a variety of feeds where the feed item is determined to be relevant (e.g., merchant newsfeed, consumer newsfeed, location-based newsfeed, etc.). A newsfeed may be updated with additional feed items. For example, server 110 may receive promotion data from other merchant devices, generate impressions, associate consumer accounts with merchants and/or impressions, and provide the impressions to the newsfeed as feed items.

In some embodiments, feed items may be provided to newsfeeds based on merchant preferences, such as may be provided to server 110 via promotion data from a merchant device. For example, the promotion data may indicate that a promotion is featured, fresh, or otherwise prioritized. In some embodiments, server 110 may be configured to generate an impression of a featured promotion and provide the impression as a feed item to one or more newsfeeds. Furthermore, in some embodiments, server 110 may be configured to order feed items within a newsfeed based on promotion data received from a merchant device.

At 616, server 110 may be configured to determine whether the consumer account purchased the promotion. In some embodiments, the feed item and/or impression may include a user interface configured to facilitate consumer purchase of the promotion. Server 110 may be configured to receive promotion purchase data provided via the user interface indicating purchase of the promotion, such as from a consumer device. Based on the promotion purchase data, server 110 may be configured to process the purchase and facilitate redemption as discussed herein.

In response to determining that the consumer account purchased the promotion, method 600 may return to 610, where server 110 may be configured to continue receiving promotion data from one or more merchant devices, generating promotions and impressions of the promotions as feed items based on the promotion data, and so forth.

Returning to 616, in response to determining that the consumer account purchased the promotion, method 600 may proceed to 618, where server 110 may be configured to generate historical data. In some embodiments, subsequent to a purchase of a promotion, server 110 may be configured to generate historical data (e.g., historical consumer data) based on the promotion purchase data and/or promotion purchase. The historical data may be subsequently used to determine consumer preference data regarding merchants and/or promotions (e.g., at 614) relevant to the consumer account. Server 110 may provide other impressions of other promotions to the newsfeed based on the historical data.

At 620, server 110 may be configured to provide a redemption notification as a feed item to the newsfeed. The redemption notification feed item may be triggered based on a number of factors and the discussion at 422 of method 400 may be applicable at 620. In some embodiments, server 110 may be configured to provide the redemption notification feed item to a consumer newsfeed associated with the consumer account. Other newsfeeds (e.g., other consumer newsfeeds, merchant newsfeeds, location-based newsfeeds, group newsfeeds, topical newsfeeds, etc,) accessed by the consumer account may also be dynamically updated to include the redemption notification feed item when triggered.

At 622, server 110 may be configured to remove the impression of the promotion from the newsfeed. For example, an impression of a promotion purchased by a consumer can be removed from a consumer newsfeed associated with the consumer account. Method 600 may then proceed to 624 and end.

Conclusion

Many modifications and other embodiments will come to mind to one skilled in the art to which these embodiments pertain having the benefit of the teachings presented in the foregoing descriptions and the associated drawings. For example, the techniques discussed herein involving a providing group promotions may easily be extended to other contexts where goods, services, and/or experiences may be offered to groups of consumers. Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for providing an interactive merchant interface configured to provide efficient and location-aware routing of electronic data, comprising:

a cloud server circuitry comprising a plurality of interconnected servers, wherein each of the plurality of interconnected servers comprises at least one processor;

the plurality of interconnected servers further comprising at least (i) a first server comprising a first processor and (ii) a second server comprising a second processor, and wherein two or more functions are distributed among the plurality of interconnected servers such that a first function performed by the first processor differs from a second function performed by the second processor;

a database configured to store at least merchant location data;

the cloud server circuitry being configured to:

provide the interactive merchant interface to a merchant device, wherein the interactive merchant interface comprises at least one graphical display;

receive promotion data from the merchant device via the interactive merchant interface, wherein the promotion data comprises the merchant location data defining one or more merchant locations that are distinct from one another, and wherein the one or more merchant locations are each respectively associated with one or more merchant devices;

in response to receiving merchant approval data via the interactive merchant interface, generate a plurality of impressions of a plurality of promotions based on the promotion data, wherein each of the plurality of impressions comprises an impression user interface configured to, in response to receiving promotion purchase data indicating purchase of a promotion of the plurality of promotions, complete a consumer purchase of the promotion;

provide, via a network, an electronic newsfeed user interface to a consumer device, wherein the electronic newsfeed user interface comprises a plurality of feed items corresponding to the plurality of impressions of the plurality of promotions;

receive, via the network, the promotion purchase data from the consumer device indicating the purchase of the promotion via the electronic newsfeed user interface;

complete the consumer purchase of the promotion based on the promotion purchase data;

subsequent to completing the purchase of the promotion:

determine, in response to completing the purchase of the promotion, a real-time location of the consumer device based on one or more of an Internet Protocol (IP) address associated with the consumer device, cell-tower triangulation data associated with the consumer device, global positioning system (GPS) data associated with the consumer device, or a personal area network (PAN) associated with the consumer device;

determine a redemption fulfillment option for the promotion based at least in part on the real-time location of the consumer device and redemption fulfillment option data received from the consumer device, wherein the redemption fulfillment option data includes at least one of a shipping option or an in-store pickup option, wherein the determination of the redemption fulfillment option is based on the cloud server circuitry being configured to:
  in response to determining that the real-time location of the consumer device is not within a predetermined threshold relative to the one or more merchant locations defined by the merchant location data, associate the shipping option with a default selection status and the in-store pickup option with a secondary selection status;
  determine a redemption merchant location from the one or more merchant locations based at least in part on the real-time location of the consumer device and the merchant location data, wherein the determination of the redemption merchant location is based on the cloud server circuitry being configured to:
    access the merchant location data from the database;
    determine at least one merchant location from the one or more merchant locations that is capable of fulfilling redemption of the promotion via the redemption fulfillment option based on the merchant location data; and
    determine a nearest merchant location to the real-time location of the consumer device from the at least one merchant location as the redemption merchant location; and
  route, via the network, at least one of (a) shipping data to a second merchant device associated with the redemption merchant location, or (b) an order preparation trigger notification to the second merchant device associated with the redemption merchant location.

2. The apparatus of claim 1, wherein:
the cloud server circuitry configured to determine the redemption fulfillment option includes the cloud server circuitry being configured to determine the redemption fulfillment option as the shipping option; and
in response to determining that the redemption fulfillment option is the shipping option, the cloud server circuitry transmits the shipping data to the second merchant device associated with the redemption merchant location via the network.

3. The apparatus of claim 2, wherein the cloud server circuitry is further configured to provide redemption data to the consumer device, wherein the redemption data incudes one or more of a shipping timeline or return instructions.

4. The apparatus of claim 1, wherein:
the cloud server circuitry configured to determine the redemption fulfillment option includes the cloud server circuitry being configured to determine the redemption fulfillment option as the in-store pickup option; and
the cloud server circuitry is configured to:
  generate an instrument for the redemption of the promotion; and
  transmit the instrument to the consumer device via the network.

5. The apparatus of claim 4, wherein:
the cloud server circuitry is further configured to provide redemption data to the consumer device; and
the redemption data includes redemption instructions and a redemption deadline.

6. The apparatus of claim 1, wherein:
the cloud server circuitry configured to determine the redemption fulfillment option includes the cloud server circuitry being configured to determine the redemption fulfillment option as the in-store pickup option; and
the cloud server circuitry is configured to:
  generate a promotion redemption identifier;
  transmit, via the network, the promotion redemption identifier to the consumer device via the network; and
  receive, via the network, the promotion redemption identifier from the merchant device.

7. The apparatus of claim 1, wherein the determination of the redemption merchant location is further based on the cloud server circuitry being configured to:
provide, via the network, one or more merchant location indicators corresponding to the one or more merchant locations to the consumer device via a user interface, wherein the one or more merchant location indicators are ordered on the user interface based on a corresponding distance between a corresponding merchant location of the one or more merchant locations and the real-time location of the consumer device; and
subsequent to providing the one or more merchant location indicators to the consumer device, receive redemption location data from the consumer device via the network, the redemption location data indicating a selection of the redemption merchant location for the redemption of the promotion.

8. The apparatus of claim 1, wherein:
the cloud server circuitry configured to determine the redemption fulfillment option includes the cloud server circuitry being configured to determine the redemption fulfillment option as the in-store pickup option; and
the cloud server circuitry is further configured to:
  determine, based on the real-time location of the consumer device, whether the real-time location of the consumer device is within an in-store pickup notification distance of the redemption merchant location; and
  transmit, in response to determining that the real-time location of the consumer device is within the in-store pickup notification distance of the redemption merchant location, an in-store pickup notification to the merchant device.

9. The apparatus of claim 1, wherein the cloud server circuitry configured to determine the redemption fulfillment option includes the cloud server circuitry being configured to:
in response to determining that the real-time location of the consumer device is within the predetermined threshold, determine the redemption fulfillment option as at least one of the shipping option or the in-store pickup option.

10. A machine-implemented method for providing an interactive merchant interface configured to provide efficient and location-aware routing of electronic data, comprising:
communicating with a cloud server circuitry comprising a plurality of interconnected servers, wherein each of the plurality of interconnected servers comprises at least one processor, wherein the plurality of interconnected servers further comprises at least (i) a first server comprising a first processor and (ii) a second server comprising a second processor;
distributing two or more functions among the plurality of interconnected servers such that a first function performed by the first processor differs from a second function performed by the second processor;

providing, by the cloud server circuitry, the interactive merchant interface to a merchant device, wherein the interactive merchant interface comprises at least one graphical display;

receiving promotion data from the merchant device via the interactive merchant interface, wherein the promotion data comprises merchant location data defining one or more merchant locations that are distinct from one another, and wherein the one or more merchant locations are each respectively associated with one or more merchant devices;

in response to receiving merchant approval data via the interactive merchant interface, generating a plurality of impressions of a plurality of promotions based on the promotion data, wherein each of the plurality of impressions comprises an impression user interface configured to, in response to receiving promotion purchase data indicating purchase of a promotion of the plurality of promotions, complete a consumer purchase of the promotion;

providing, via a network, an electronic newsfeed user interface to a consumer device, wherein the electronic newsfeed user interface comprises a plurality of feed items corresponding to the plurality of impressions of the plurality of promotions;

receiving, by the cloud server circuitry and from the consumer device via the network, the promotion purchase data indicating the purchase of the promotion via the electronic newsfeed user interface;

completing, by the cloud server circuitry, the consumer purchase of the promotion based on the promotion purchase data;

subsequent to completing the purchase of the promotion:
  determining, by the cloud server circuitry and in response to completing the purchase of the promotion, a real-time location of the consumer device based on one or more of an Internet Protocol (IP) address associated with the consumer device, cell-tower triangulation data associated with the consumer device, global positioning system (GPS) data associated with the consumer device, or a personal area network (PAN) associated with the consumer device;
  determining, by the cloud server circuitry, a redemption fulfillment option for the promotion based at least in part on the real-time location of the consumer device and redemption fulfillment option data received from the consumer device, wherein the redemption fulfillment option data includes at least one of a shipping option or an in-store pickup option, wherein the determination of the redemption fulfillment option is based on, by the cloud server circuitry:
    in response to determining that the real-time location of the consumer device is not within a predetermined threshold relative to the one or more merchant locations defined by the merchant location data, associating the shipping option with a default selection status and the in-store pickup option with a secondary selection status;
  determining, by the cloud server circuitry, a redemption merchant location from the one or more merchant locations based at least in part on the real-time location of the consumer device and the merchant location data, wherein the determination of the redemption merchant location is based on, by the cloud server circuitry:
    accessing the merchant location data;
    determining at least one merchant location from the one or more merchant locations that is capable of fulfilling redemption of the promotion via the redemption fulfillment option based on the merchant location data; and
    determining a nearest merchant location to the real-time location of the consumer device from the at least one merchant location as the redemption merchant location; and
  routing, via the network, at least one of (a) shipping data to a second merchant device associated with the redemption merchant location, or (b) an order preparation trigger notification to the second merchant device associated with the redemption merchant location.

11. The machine-implemented method of claim 10, wherein:
  determining the redemption fulfillment option includes determining the redemption fulfillment option as the shipping option; and
  wherein the machine-implemented method further includes providing the shipping data to the second merchant device associated with the redemption merchant location via the network.

12. The machine-implemented method of claim 11, further comprising providing, by the cloud server circuitry, redemption data to the consumer device, wherein the redemption data incudes one or more of a shipping timeline or return instructions.

13. The machine-implemented method of claim 10, wherein:
  determining the redemption fulfillment option includes determining the redemption fulfillment option as the in-store pickup option; and
  wherein the machine-implemented method further includes:
    generating an instrument for the redemption of the promotion; and
    providing the instrument to the consumer device via the network.

14. The machine-implemented method of claim 13 further comprising providing, by the cloud server circuitry, redemption data to the consumer device, wherein the redemption data incudes redemption instructions and a redemption deadline.

15. The machine-implemented method of claim 10, wherein:
  determining the redemption fulfillment option includes determining the redemption fulfillment option as the in-store pickup option; and
  wherein the machine-implemented method further includes:
    generating a promotion redemption identifier;
    providing, via the network, the promotion redemption identifier to the consumer device via the network; and
    receiving, via the network, the promotion redemption identifier from the merchant device.

16. The machine-implemented method of claim 15 further comprising providing, by the cloud server circuitry, redemption data to the consumer device, wherein the redemption data incudes redemption instructions and a redemption deadline.

17. The machine-implemented method of claim 10, wherein:
  determining the redemption fulfillment option includes determining the redemption fulfillment option as the in-store pickup option; and wherein the machine-implemented method further includes:
  generating a promotion redemption identifier;
  providing, via the network, the promotion redemption identifier to the consumer device via the network; and
  receiving, via the network, the promotion redemption identifier from the merchant device.

18. The machine-implemented method of claim 10, wherein the determination of the redemption merchant location is further based on:
  providing, via the network, one or more merchant location indicators corresponding to the one or more merchant locations to the consumer device via a user interface, wherein the one or more merchant location indicators are ordered on the user interface based on a corresponding distance between a corresponding merchant location of the one or more merchant locations and the real-time location of the consumer device; and
  subsequent to providing the one or more merchant location indicators to the consumer device, receiving redemption location data from the consumer device via the network, the redemption location data indicating a selection of the redemption merchant location for the redemption of the promotion.

19. The machine-implemented method of claim 10, wherein:
  determining the redemption fulfillment option includes determining the redemption fulfillment option as the in-store pickup option; and wherein the machine-implemented method further includes:
    determining, based on the real-time location of the consumer device, whether the real-time location of the consumer device is within an in-store pickup notification distance of the redemption merchant location; and
    in response to determining that the real-time location of the consumer device is within the in-store pickup notification distance of the redemption merchant location, sending an in-store pickup notification to the merchant device via the network.

20. A computer program product for providing an interactive merchant interface configured to provide efficient and location-aware routing of electronic data, the computer program product comprising a non-transitory computer readable storage medium and computer program instructions stored therein, the computer program instructions comprising program instructions to:
  provide the interactive merchant interface to a merchant device, wherein the interactive merchant interface comprises at least one graphical display;
  receive promotion data from the merchant device via the interactive merchant interface, wherein the promotion data comprises merchant location data defining one or more merchant locations that are distinct from one another, and wherein the one or more merchant locations are each respectively associated with one or more merchant devices;
  in response to receiving merchant approval data via the interactive merchant interface, generate a plurality of impressions of a plurality of promotions based on the promotion data, wherein each of the plurality of impressions comprises an impression user interface configured to, in response to receiving promotion purchase data indicating purchase of a promotion of the plurality of promotions, complete a consumer purchase of the promotion;
  provide, via a network, an electronic newsfeed user interface to a consumer device, wherein the electronic newsfeed user interface comprises a plurality of feed items corresponding to the plurality of impressions of the plurality of promotions;
  receive, via the network, the promotion purchase data from the consumer device indicating the purchase of the promotion via the electronic newsfeed user interface;
  complete the purchase of the promotion based on the promotion purchase data;
  subsequent to completing the purchase of the promotion:
    determine, in response to completing the purchase of the promotion, a real-time location of the consumer device based on one or more of an Internet Protocol (IP) address associated with the consumer device, cell-tower triangulation data associated with the consumer device, global positioning system (GPS) data associated with the consumer device, or a personal area network (PAN) associated with the consumer device;
    determine a redemption fulfillment option for the promotion based at least in part on the real-time location of the consumer device and redemption fulfillment option data received from the consumer device, wherein the redemption fulfillment option data includes at least one of a shipping option or an in-store pickup option, wherein the computer program instructions comprising the program instructions to:
      in response to determining that the real-time location of the consumer device is not within a predetermined threshold relative to the one or more merchant locations defined by the merchant location data, associate the shipping option with a default selection status and the in-store pickup option with a secondary selection status;
    determine a redemption merchant location from the one or more merchant locations based at least in part on the real-time location of the consumer device and the merchant location data, wherein the determination of the redemption merchant location is based on:
      accessing the merchant location data;
      determining at least one merchant location from the one or more merchant locations that is capable of fulfilling redemption of the promotion via the redemption fulfillment option based on the merchant location data; and
      determining a nearest merchant location to the real-time location of the consumer device from the at least one merchant location as the redemption merchant location; and
    route, via the network, at least one of (a) shipping data to a second merchant device associated with the redemption merchant location, or (b) an order preparation trigger notification to the second merchant device associated with the redemption merchant location.

\* \* \* \* \*